US006194705B1

(12) United States Patent
Nakada et al.

(10) Patent No.: US 6,194,705 B1
(45) Date of Patent: Feb. 27, 2001

(54) METHOD AND APPARATUS FOR DETECTION POSITION DEVIATION OF ELECTRON GUN

(75) Inventors: Satoshi Nakada, Kanagawa; Koji Ichida, Tokyo; Yuzuru Watanabe, Fukushima, all of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/163,480

(22) Filed: Sep. 30, 1998

(30) Foreign Application Priority Data

Oct. 3, 1997 (JP) .................................................. 9-271555

(51) Int. Cl.[7] ................................ H01J 9/44; G01J 4/00

(52) U.S. Cl. .................... 250/225; 250/559.09; 356/364; 445/64

(58) Field of Search .............................. 250/225, 559.08, 250/559.07, 559.09, 559.29, 559.23; 356/371, 372, 373, 375, 429, 430, 237, 364, 369; 445/4, 64, 63

(56) References Cited

U.S. PATENT DOCUMENTS

| | | | | |
|---|---|---|---|---|
| 4,253,078 | * | 2/1981 | Tagawa et al. | 335/212 |
| 4,687,454 | * | 8/1987 | Giudici | 445/5 |
| 5,043,630 | * | 8/1991 | Faillon et al. | 315/5 |
| 5,383,025 | * | 1/1995 | Forrest | 356/371 |

* cited by examiner

*Primary Examiner*—John R. Lee
(74) *Attorney, Agent, or Firm*—Ronald P. Kananen; Rader, Fishman & Grauer

(57) ABSTRACT

A method and apparatus for detecting position deviation of an electron gun in which, by increasing the light utilization efficiency to render the field of sight lighter and by reducing the amount of reflected light from the grid surface, the reflected light from the electron beam emitting surface is lighter to enable an edge of an electron beam transmitting hole to be discerned accurately to detect the position deviation of the electron gun accurately. The linear polarized light is illuminated on the electron gun and the light reflected by this electron gun is observed by a light polarization unit to detect the position deviation between grids of the electron gun.

15 Claims, 10 Drawing Sheets

METHOD AND APPARATUS FOR DETECTION POSITION DEVIATION OF ELECTRON GUN

BACKGROUND OF THE INVENTION

1. Field of the Invention

This invention relates to a method and apparatus for detecting position deviation between grids of an assembled electron gun.

2. Description of the Related Art

An electron gun, arranged in a cathode ray tube used in a television receiver for radiating an electron beam to a phosphor surface, is made up of a cathode for emitting an electron beam and a plurality of grids making up an electrode.

This electron gun is assembled so that plural grids are arrayed on the same axial line and a cathode is arranged in the lowermost one of these plural grids (first grid).

The electron gun is configured so that an electron beam radiated from the cathode is passed through the grids so as to be controlled, accelerated and converged to illuminate a predetermined phosphor on the phosphor surface to emit light from this phosphor.

If the electron gun is a single type electron gun (one gun three beam type), the first grid is made up of three bottomed cylindrically-shaped in-line single grids. In the inside of the single grids, a cathode for emitting light from a red phosphor, another cathode for emitting light from a green phosphor and yet another cathode for emitting light from a blue phosphor are arranged independently of one another.

At a mid portion of the bottom surface of each of three single grids making up the first grid is formed an extremely small electron beam transmitting hole for transmitting the electron beam emitted from the associated cathode. In a facing surface to the first grid of another grid (second grid) arranged in adjacency to the first grid are formed three extremely small electron beam transmitting holes. The bottom surface of the first grid and the facing surface of the second grid are abutted to each other so that the electron beam transmitting holes provided in the three single grids will be coincident with those provided in the second grid.

This one-gun three-beam type electron gun transmits the electron beams emitted from each cathode through the associated electron beam transmitting holes so that the three beams intersect one another at the center of the lens constituted by plural grids and then diverge from one another so as to undergo refraction on an electro-static polarizing plate and so as to be converged on the phosphor surface.

If the grids making up the electron gun are poor in assembling accuracy, there is produced deviation in the shape or trajectory of the outgoing electron beams. In particular, since the first grid G1 and the second grid G2 are positioned so that extremely small electron beam transmitting holes 100, 101 will be in register with each other, if there is induced position deviation exceeding an allowable limit as shown in FIG. 1, the electron beam emitted from the cathode 102 is not transmitted properly through the electron beam transmitting holes, such that significant deviation is produced in the shape or the trajectory of the electron beam.

If the electron gun in which the electron beam is deviated in shape or trajectory is mounted in the cathode ray tube, the electron beams are not illuminated at a proper position on the phosphor surface with a proper shape thus deteriorating the picture quality.

Such position deviation of an electron gun is conventionally detected by a position deviation detection device 110 shown in FIG. 2. This position deviation detection device 110 shown in FIG. 2 is made up of an XY stage 111 supporting an electron gun 120 for movement in the X-axis direction and in the Y-axis direction, a fiber lighting device 112 for lighting the electron gun 120 supported on the XY stage 111 from its lateral side, and a microscope 113 by which a viewer can observe the electron gun 120 illuminated by the fiber lighting device 112 so as to view the cathode arranged in the inside of the lowermost grid through respective grids from above the uppermost grid.

The electron gun 120 is set on the setting surface of the XY stage 111 of the position deviation detection device 110 so that the center axis of the gun will be substantially perpendicular to this setting surface, and the light is directed from the fiber lighting device 112 from the lateral side for illuminating the space between the grids.

For detecting position deviation between the first grid G1 and the second grid G2, an edge of the electron beam transmitting hole 100 of the illuminated first grid G1 and an edge of the electron beam transmitting hole 101 of the second grid G2 are observed with a microscope 113 to detect the position deviation.

In the detection method employing the conventional position deviation detection device 110, in which the electron gun is illuminated from its lateral side by the electron gun 120, the volume of light that can be observed is small as compared to the volume of the illuminating light, so that the so-called light utilization efficiency is low, with the field of view being dark. Since the field of view is dark, the grid cannot be observed even with the increased magnification ratio of the microscope so that the position deviation of the electron gun 120 occasionally cannot be detected accurately.

In the conventional detection method employing the conventional position deviation detection device 110, in which the electron gun is illuminated from its lateral side by the electron gun 120, the grid surface cannot be illuminated uniformly, so that the entire grid cannot be observed evenly.

As a method for increasing the utilization efficiency of the illuminating light and evenly illuminating the light on the grid surface in order to improve the position deviation, it may be contemplated to illuminate the light from the uppermost grid of the electron gun 120 in a direction along the center axis of the grid to detect the position deviation based on the observation of the reflected light by downward perpendicular illumination. However, if the position deviation between the first grid G1 and the second grid G2 is to be detected by this downward perpendicular illumination, the edge of the electron beam transmitting hole 100 of the illuminated first grid G1 and the edge of the electron beam transmitting hole 101 of the second grid G2 cannot be observed clearly to render it difficult to detect the position deviation.

That is, the first grid G1 and the second grid g2 are formed by flat metal surfaces in which the electron beam transmitting holes 100, 101 are formed by punching, with the vicinity of the edges of the electron beam transmitting holes 100, 101 being tilted in the punching direction. Thus, the volume of the reflected light from the edges of the surfaces of the first grid G1 and the second grid G2 by the downward perpendicular illumination is extremely small as compared to the volume of the light reflected from the other portions.

The light traversing the electron beam transmitting holes 100, 101 and reflected by the electron beam emitting surface of the cathode 102 arranged in the inside of the first grid G1 undergoes irregular reflection and hence is reduced in light volume.

Thus, if it is attempted to detect the position deviation between the first grid G1 and the second grid G2 by downward perpendicular illumination, the light reflected by the vicinity of the edges of the electron beam transmitting holes 100, 101 is darkly mixed with the light reflected by the electron beam radiating surface of the cathode 102, so that the edges of the electron beam transmitting holes 100, 101 of the first grid G1 and the second grid G2 cannot be discerned clearly.

SUMMARY OF THE INVENTION

It is therefore an object of the present invention to provide a method and apparatus for detecting the position deviation of an electron gun in which the light utilization efficiency is increased to render the field of view more bright and the volume of the reflected light from the grid surface is diminished to provide relatively bright reflected light from the electron beam radiating surface of the cathode in order to render it possible to discern the edges of the electron beam transmitting holes to detect the position deviation of the electron gun more accurately.

In one aspect, the present invention provides a method for detecting position detection of an electron gun including illuminating linear polarized light on an electron gun and observing the reflected light from the electron gun via light polarizing means to detect position deviation between grids of the electron gun.

The linear polarized light illuminated on the electron gun is reflected by the surface of a grid of the electron gun and the electron beam reflecting surface of the cathode.

The reflected light from the grid surface proceeds to light polarizing means, as it keeps up the linear polarized state, because the grid surface is a flat metal surface. The major portion of the light volume of the reflected linear polarized light from the grid surface is interrupted depending on the difference in orientation of the axis of polarization thereof from the axis of polarization of the light polarizing means.

The light reflected by the electron beam radiating surface of the cathode undergoes irregular reflection on the electron beam radiating surface of the cathode formed by micro-irregularities of oxides and proceeds to the light polarizing means in the collapsed light polarization state. The reflected light from the electron beam radiating surface of the cathode has random state of light polarization and hence is transmitted in a substantially constant light volume through the plight polarizing means.

Thus, by illuminating the linear polarized light on the electron gun and by observing the light reflected by the electron gun via light polarizing means, the reflected light from the electron beam radiating surface of the cathode becomes brighter to enable the boundary portion between the electron beam radiating surface of the cathode and the grid to be discerned clearly.

In the electron gun position deviation detection method according to the present invention, the axis of polarization of the light polarizing means is preferably set so as to be substantially perpendicular to the axis of polarization of the linear polarized light radiated n the electron gun.

If the axis of polarization of the light polarization means is set at right angles to that of the linear polarized light. The major portion of the linear polarized light reflected by the grid surface is interrupted by the light polarization means, thus improving light contrast between the light reflected by the grid surface, the light reflected by the vicinity of the edges of the surfaces of the electron beam transmitting holes of the grids and the light reflected by the electron beam radiating surface of the cathode.

In another aspect, the present invention provides a position deviation detection apparatus for an electron gun including illuminating means for illuminating linear polarized light on the electron gun, light polarization means arranged on an optical path of the reflected light from he electron gun and position deviation detection means for capturing the reflected light transmitted through he light polarization means for detecting position deviation between grids of the electron gun.

In yet another aspect, the present invention provides a position deviation detection apparatus for an electron gun including illuminating means for illuminating linear polarized light on the electron gun, light polarization means arranged on an optical path of the reflected light from said electron gun and position deviation detection means for capturing the reflected light transmitted through said light polarization means for detecting position deviation between grids of said electron gun.

The linear polarized light illuminated on the electron gun is reflected by the surface of a grid of the electron gun and the electron beam reflecting surface of the cathode.

The reflected light from the grid surface proceeds to light polarizing means, as it keeps up the linear polarized state, because the grid surface is a flat metal surface. The major portion of the light volume of the reflected linear polarized light from the grid surface is interrupted depending on the difference in orientation of the axis of polarization thereof from the axis of polarization of the light polarizing means.

The light reflected by the electron beam radiating surface of the cathode undergoes irregular reflection on the electron beam radiating surface of the cathode formed by micro-irregularities of oxides and proceeds to the light polarizing means in the collapsed light polarization state. The reflected light from the electron beam radiating surface of the cathode has random state of light polarization and hence is transmitted in a substantially constant light volume through the plight polarizing means.

The reflected light from the electron gun, transmitted through the light polarizing means, is captured by position deviation detection means, which then observes the reflected light to detect position deviation between the grids of the electron gun.

With the electron gun position deviation detection device according to the present invention, the axis of polarization of the light polarizing means is set substantially at right angles to the axis of polarization of the linear polarized light illuminated on the electron gun.

Thus, if the axis of polarization of the light polarizing means is set substantially at right angles to the axis of polarization of the linear polarized light illuminated on the electron gun, the major portion of the linear polarized light reflected by the grid surface is interrupted by the light polarization means, thus improving light contrast between the light reflected by the grid surface, the light reflected by the vicinity of the edges of the surfaces of the electron beam transmitting holes of the grids and the light reflected by the electron beam radiating surface of the cathode.

With the electron gun position deviation detection device according to the present invention, the position deviation detection means preferably includes a CCD camera for capturing the light reflected by the electron gun and a display unit for displaying the reflected light captured by the CCD camera as an image.

With the electron gun position deviation detection method according to the present invention, in which the linear polarized light is illuminated on the electron gun and the light reflected by this electron gun is observed via light polarizing means, the volume of light reflected from the grid surface of the electron gun is decreased to assure brighter light reflected by the electron beam emitting surface of the cathode to lead to improved contrast in brightness between the vicinity of the edges of the electron beam transmitting holes formed in the grid and the electron beam emitting surface of the cathode. The result is that the edges of the electron beam transmitting holes can be discriminated clearly to assure highly accurate detection of the position deviation in the electron gun.

With the electron gun position deviation detection apparatus according to the present invention, the volume of light emitted by the illuminating means and reflected by the electron gun is decreased by light polarizing means arranged on the optical path the linear polarized light depending on its polarized state. Thus, with the use of the present electron gun position deviation detection apparatus, it becomes possible to improve the contrast in light brightness between the vicinity of the edge of the electron beam transmitting hole provided in the grid and the electron beam emitting surface of the cathode to assure clear discrimination of the edges of the electron beam transmitting holes and accurate detection of the position deviation of the electron gun.

DESCRIPTION OF THE PREFERRED EMBODIMENTS

Figure 1:
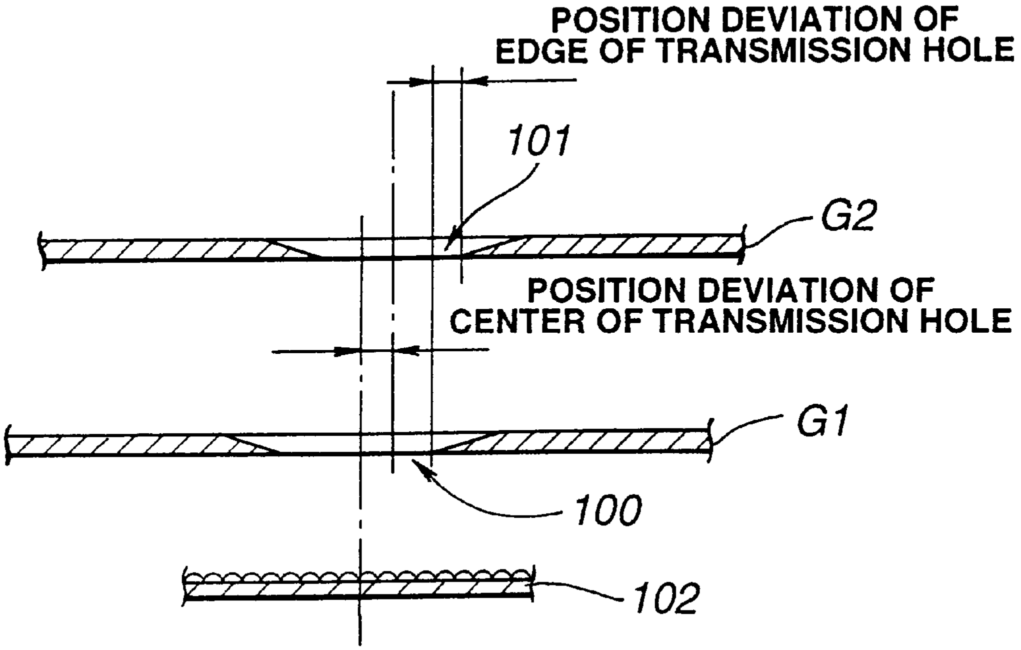
FIG. 1 is a cross-sectional view showing the state of position deviation between the grids of the electron gun.

Referring to the drawings, preferred embodiments of the present invention will be explained in detail.

Figure 2:
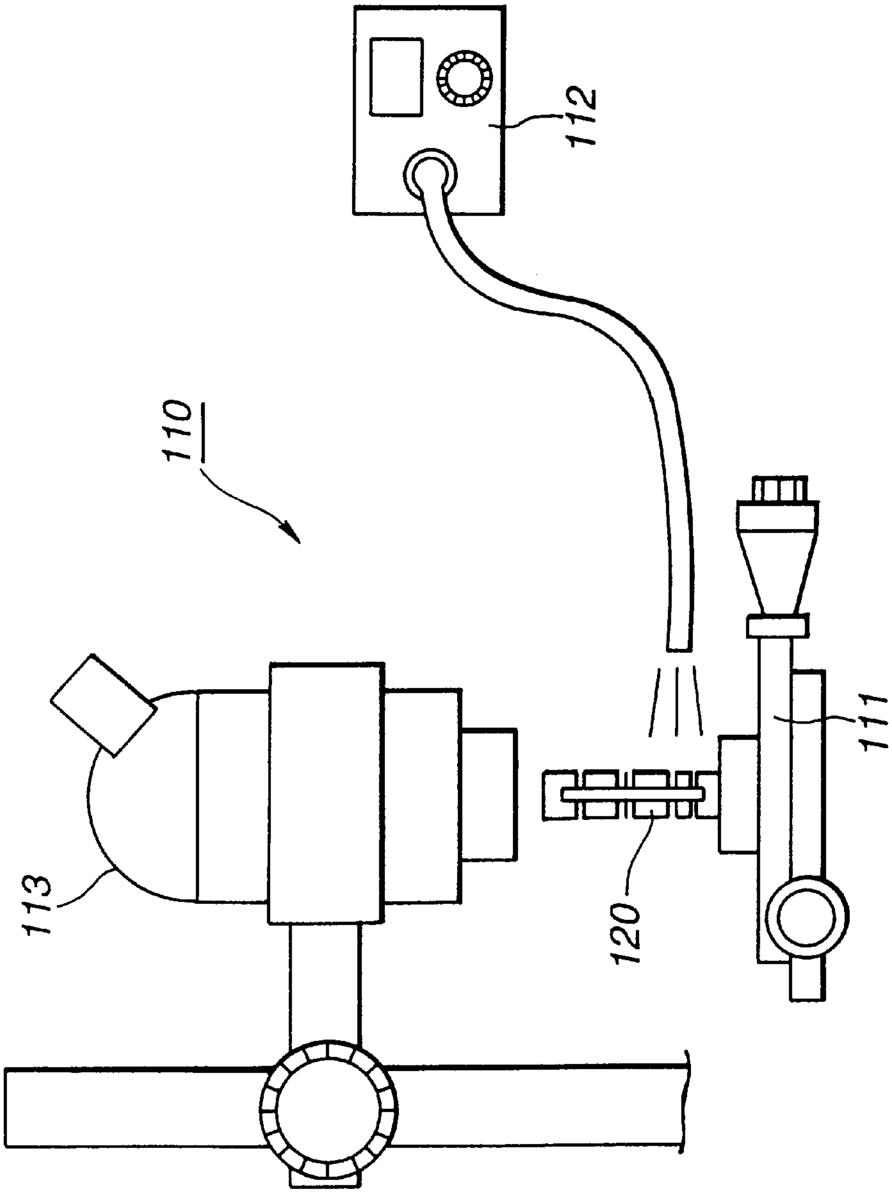
FIG. 2 is a side view showing a conventional detection device of a electron gun.

The position deviation detection method according to the present invention consists in illuminating the linear polarized light on an electron gun and in observing the reflected light from the electron gun via light polarizing means to detect the position deviation between the grids of the electron gun. The position deviation detection method is implemented by a position deviation detection device 1 shown in FIGS. 1 to 3.

Figure 3:
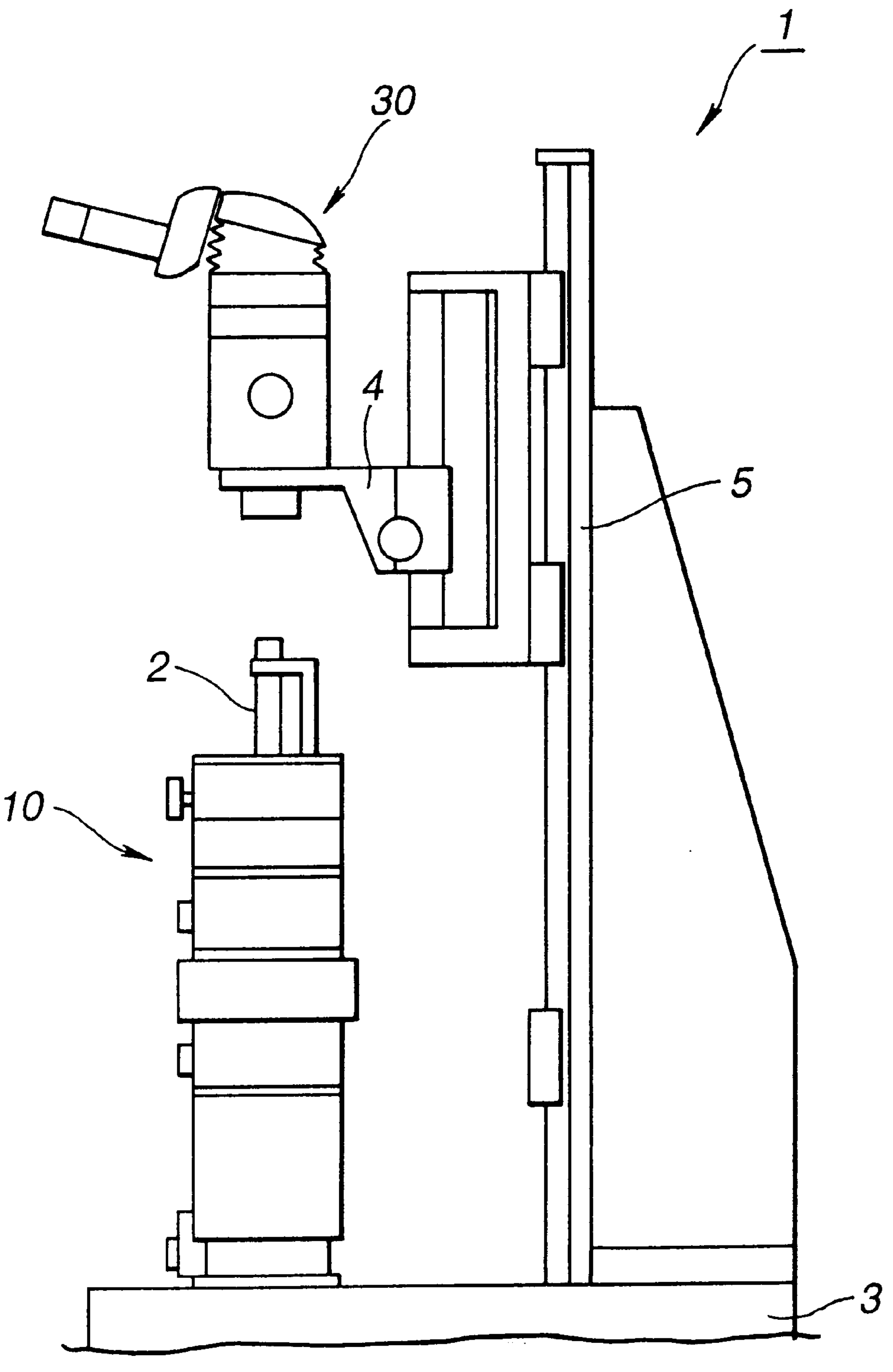
FIG. 3 is a side view showing a position deviation detection device for an electron gun according to the present invention.

The position deviation detection device 1 includes a supporting stage 10 for movably supporting the electron gun 2, and a polarization microscope 30 for illuminating the linear polarized light on an electron gun 2 supported on the supporting stage 10 and for observing the reflected light, as shown in FIG. 3.

Figure 4:
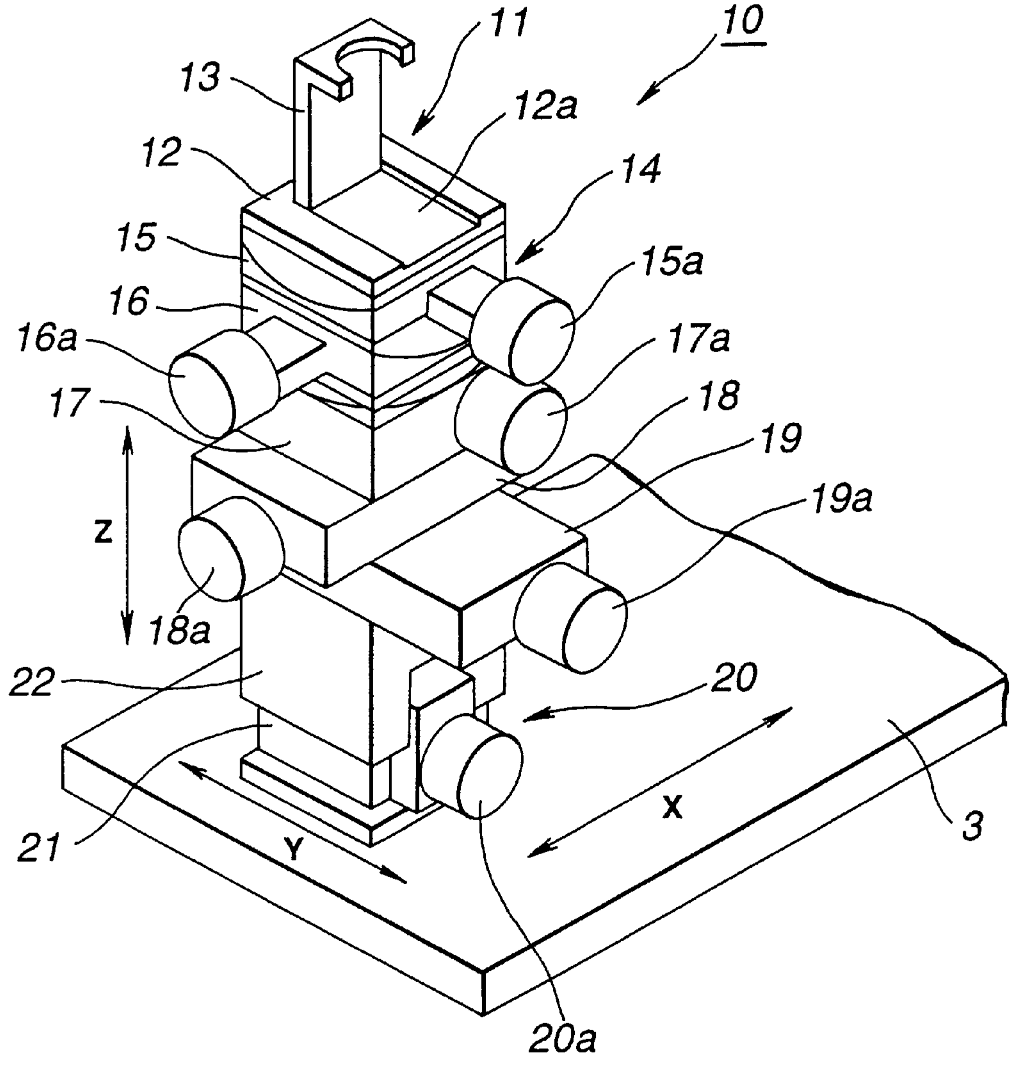
FIG. 4 is a perspective view showing a supporting stage of the position deviation detection device shown in FIG. 3.

The supporting stage 10 includes, as shown in FIG. 4, a supporting portion 11 for supporting the electron gun 2, a tilting stage 14 for tilting the electron gun 2 supported by the supporting portion 11 in a defined direction, and a rotary stage 17 for rotating the electron gun 2 supported by the supporting portion 11. The supporting stage 10 also includes a Y-axis stage 18 for causing movement of the electron gun 2 supported by the supporting portion 11 along the Y axis indicated by arrow Y in FIG. 4, a Y-axis stage 19 for causing movement of the electron gun 2 supported by the supporting portion 11 in the direction indicated by arrow X in FIG. 4 and a Z-axis stage 20 for causing movement of the electron gun 2 supported by the supporting portion 11 along the Z-axis direction indicated by arrow Z in FIG. 4. The above enumerated components are stacked along the Z-axis direction and mounted as an integrally movable stage on a base block 3.

The supporting portion 11 has a setting table 12 on which to set the electron gun 2 and a holder 13 for holding the outer periphery of the electron gun 2. The setting table 12 has a setting surface 12*a* perpendicular to the Z-axis for supporting one cathode side end of the electron gun 2. The holder 13 holds the outer periphery of the electron gun 2. Thus, the electron gun 2 is supported in stability on the supporting stage 10 so that its center axis extends along the Z-axis direction.

To the side of the supporting portion 11 facing the base block 3 is connected the tilting stage 14.

The tilting stage 14 includes an X-axis tilting stage 15 for tilting the supporting portion 11 at a defined angle with respect to the X-axis, and a Y-axis tilting stage 16 for tilting the supporting portion 11 at a defined angle with respect to the Y-axis. The X-axis tilting stage 15 and the Y-axis tilting stage 16 are provided with thrusting actuation units 15*a*, 16*a*, respectively. The tilting stage 14 has the thrusting actuation units 15*a*, 16*a* thrust to tilt the supporting portion 11 and the electron gun 2 carried thereon in the X-axis or Y-axis directions.

To the side of the tilting stage 14 facing the base block 3 is connected the rotary stage 17.

The rotary stage 17 has a thrusting actuation unit 17*a* which is thrust to cause rotation of the tilting stage 14, supporting portion 11 and the electron gun 2 supported thereon about the Z-axis as the center of rotation.

To the side of the rotary stage 17 facing the base block 3 is connected a Y-stage The Y-stage 18 includes a thrusting actuation units 18*a* which is thrust to cause movement of the rotary stage 17, tilting stage 14, supporting portion 11 and the electron gun 2 supported thereon in the Y-axis direction.

Tothe side of the Y-stage 18 facing the base block 3 is connected a X-stage 19.

The X-stage 19 is provided with a thrusting actuation units 19*a* which, when thrustingly actuated, causes movement of the Y-stage 18, rotary stage 17, tilting stage 14, supporting portion 11 and the electron gun 2 held thereon in the direction along the X-axis.

Tothe side of the X-stage 19 facing the base block 3 is connected a Z-stage 20.

The Z-stage 20 includes a stationary portion 21 mounted on the base block 3 and a movement portion 22 connected to the X-stage 19. The Z-stage 20 is provided with a thrusting actuation units 20*a* which, when thrustingly actuated, causes movement of the movement portion 22 in the direction along Z-axis. With movement ofthis movement portion 22, the X-stage 19, Y-stage 18, rotary stage 17, tilting stage 14, supporting portion 11 and the electron gun 2 held thereon are moved in the direction along Z-axis.

Since the supporting stage 10, designed as described above, carries the electron gun 2 for movement in the directions along X-, Y and Z-axes, the electron gun 2 can be positioned accurately.

Also, since the supporting stage 10 has the mechanism of tilting the electron gun 2 carried thereon, the electron gun having the first grid arranged with an inclination relative to the center axis can be coped with appropriately.

Also, since the supporting stage 10 has a mechanism for rotating the electron gun 2, the position deviation from the X-axis direction or the y-axis direction can be detected in terms of the amount of displacement of the supporting stage 10 in the X-axis direction or in the Y-axis direction.

On the axis of the supporting stage 10 is arranged a polarization microscope 30 facing the setting surface 12*a* of the setting table 12.

Figure 5:
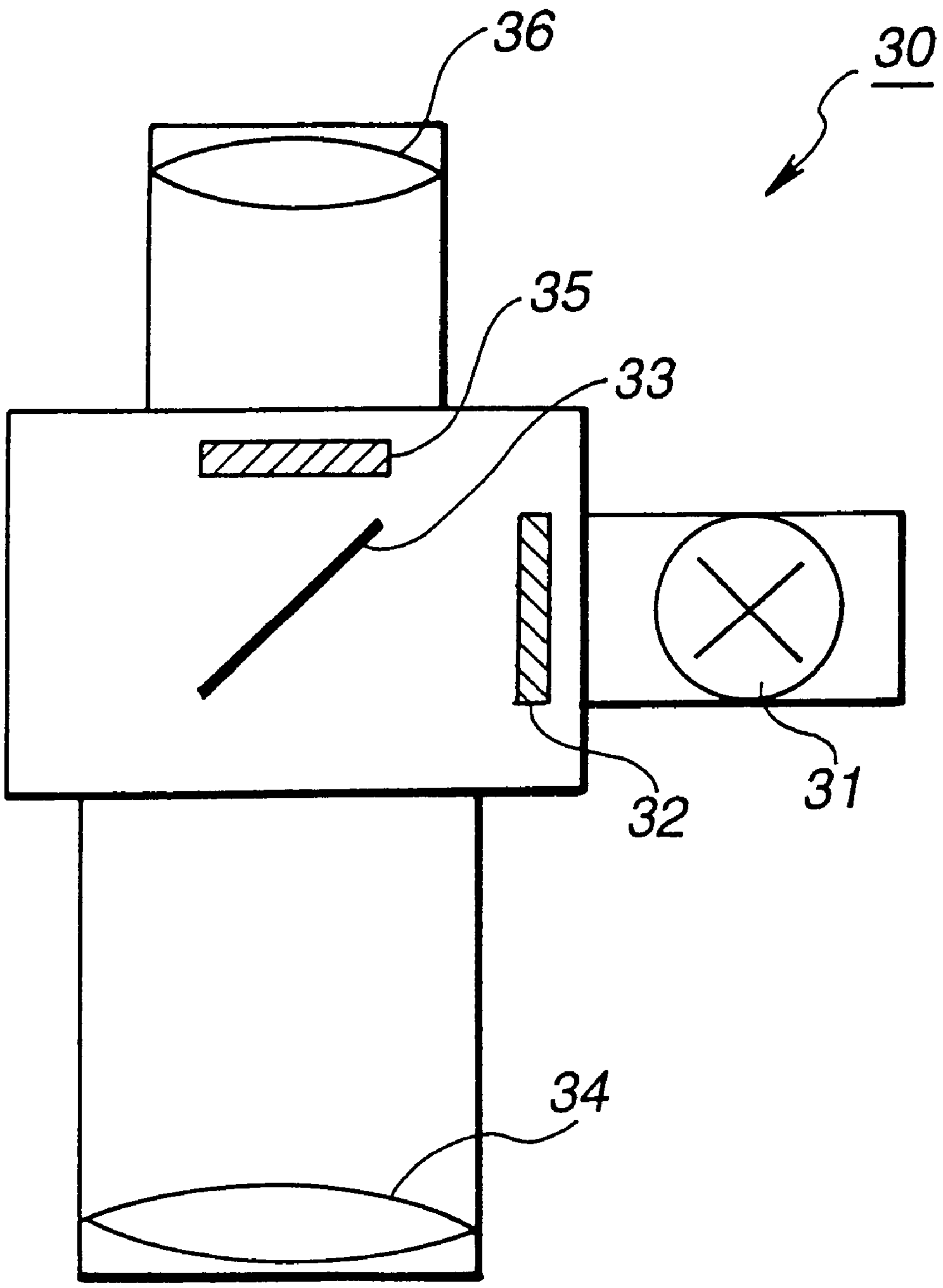
FIG. 5 is a schematic view for illustrating the structure of a polarization microscope of the position deviation detection device shown in FIG. 3.

Referring to FIG. 5, the polarization microscope 30 has a light source 31 for radiating non-polarized light, a first polarizing plate 32 for transmitting the non-polarized light from the light source 31 for converting it to linear polarized light, a half mirror 33 for transmitting a portion of the linear polarized light transmitted through the first polarizing plate 32 and for reflecting the remaining portion of the non-polarized light, an objective lens 34 for converging the light reflected by the half mirror 33 to the electron gun 2, a second polarizing plate 35 arranged on the optical path of the light reflected by the electron gun 2 and transmitted through the objective lens 34 and the half mirror 33, and an eye lens 36 for observing the reflected light transmitted through the second polarizing plate 35 as a picture.

The light source 31 radiates the non-polarized light in a direction perpendicular to the Z-axis.

The first polarizing plate 32 has an axis of polarization in a fixed direction and is arranged on the optical path of the non-polarized light emitted from the light source 31. The first polarizing plate 32 transmits the light radiated by the light source 31 to convert it into linear polarized light.

The half mirror 33 is arranged is arranged for tilting the linear polarized light transmitted through the first polarizing plate 32 on the optical path thereof at an angle of 45° relative to the Z-axis. The half mirror 33 transmits part oft the linear polarized light and reflects the remaining portion to bend it in the direction along the Z-axis.

The objective lens 34 is arranged on the optical path of the linear polarized light reflected by the half mirror 33. The objective lens 34 collects the linear polarized light reflected by the half mirror 33 to illuminate it on the electron gun 2 carried by the supporting stage 10.

The second polarizing plate 35 has the axis of polarization different from the axis of polarization of the first polarizing plate 32, and is arranged co-axially as the electron gun 2 supported on the supporting stage 10, objective lens 34 and the half mirror 33. The second polarizing plate 35 interrupts a portion of the reflected light from the electron gun 2, transmitted through the objective lens 34 and the half mirror 33, while transmitting the remaining portion of the reflected light, depending on the state of light polarization.

The eye lens 36 is arranged on the optical path of the reflected light from the electron gun 2 transmitted through the second polarizing plate 35. The eye lens 36 is provided with a position measurement micro-scale based on which it measures position deviation between grids of the electron gun 2. The reflected light from the electron gun 2 transmitted through the second polarizing plate 35 is viewed as an image through this eye lens 36.

The polarization microscope 30, constructed as described above, is connected via a connecting arm 4 to a vertical movement mechanism 5 set upright on the base block 3, and can be moved in the direction along the Z-axis.

The method for detecting position deviation of the electron gun using a position deviation detection device 1 for the electron gun is hereinafter explained. Although the following description is made of an embodiment for detecting the position deviation between the first and second grids of the electron gun 2, position deviation between other grids of the electron gun 2 can of course, be detected by the present electron gun position deviation detection method.

First, the electron gun 2 is supported by the supporting portion 11 of the supporting stage 10 in a state in which its cathode side is abutted against the setting surface 12*a*. By movement of the X-stage 19 and the Y-stage 18, the electron gun 2 is positioned in the directions along the X- and Y-axes so that the center of an electron beam transmitting hole of the first grid will be positioned on the optical axis of the polarization microscope 30.

If the electron gun 2 supported by the supporting portion 11 has its first grid tilted with respect to the center axis, the tilting stage 14 is moved for tilting the electron gun 2 so that the first grid will be parallel to the optical axis of the polarization microscope 30.

The light source 31 of the polarization microscope 30 then radiates non-polarized light which is then transmitted through the first polarizing plate 32 so as to be thereby converted to the linear polarized light. This linear polarized light is partially transmitted through and partially reflected by the half mirror 33.

The linear polarized light, reflected by the half mirror 33, is converged by the objective lens 34 to fall in the electron gun 2 in which it is illuminated on the surfaces of the first and second surfaces and on the electron beam emitting surface of the cathode.

The first and second grids are provided with flat metal surfaces, in which electron beam transmitting holes are formed by punching. The vicinity of the edges of the electron beam transmitting holes is tilted in the punching direction. Thus, the linear polarized light, illuminated on the surfaces of the first and second grids, are reflected strongly by portions other than the vicinity of the edges of the electron beam transmitting holes. However, the light volume of the reflected light is extremely small in the vicinity of the edges.

Since the grid surfaces are flat metal surfaces, the linear polarized light, illuminated on these grid surfaces, is reflected thereon as it keeps up the linear polarized state.

Since the electron beam radiating surface of the cathode present micro-irregularities of oxides, the linear polarized light, radiated on the electron beam radiating surface of the cathode through the electron beam transmitting holes of the second and first grids, is repeatedly refracted and reflected by the electron beam radiating surface of the cathode, so that the linear polarized light is reflected as the polarized state is collapsed.

The reflected light, reflected by the grid surfaces and the electron beam radiating surface of the cathode, is again transmitted through the objective lens 34 and illuminated on the half mirror 33, which then partially transmits and partially reflects the reflected light from the grid surfaces and the electron beam radiating surface of the cathode.

The light reflected by the grid surfaces and the electron beam radiating surface of the cathode and transmitted through the half mirror 33 falls on the second polarizing plate 35. The reflected light from the grid surfaces and the electron beam radiating surface of the cathode is partially interrupted by the second polarizing plate 35 and partially transmitted through the second polarizing plate 35, depending on the polarized light state.

For example, if the second polarizing plate 35 is arranged so that its axis of polarization is approximately 90° relative to the axis of polarization of the first polarizing plate 32 (cross-Nicol configuration), the majority of the reflected light from the grid surface is interrupted by the second polarizing plate 35, because this reflected light is kept in the linear polarized state produced by the second polarizing plate 35. Thus, the volume of light transmitted through the second polarizing plate 35 is of the order of 1/400 of that radiated from the light source 31. That is, the light flux of light transmitted through the half mirror 33 and the second polarizing plate 35 is of the order of 1/200 of the luminosity of the reflected light from the grid surfaces.

On the other hand, the reflected light from the electron beam radiating surface of the cathode is collapsed in its polarized state and randomized, so that the ratio of the light portion interrupted by the second polarizing plate 35 is decreased. Thus, approximately 1/16 or less of the volume of light radiated from the light source 31 is transmitted through the second polarizing plate 35. That is, the light flux after transmission through the half mirror 33 and the second polarizing plate 35 is decreased to approximately one-fourth of the luminosity of the reflected light from the electron beam radiating surface of the cathode.

The reflected light from the grid surfaces and the cathode, transmitted through the second polarizing plate 35, is visually perceived as an image via objective lens 36. If focussing adjustment is executed as the Z-stage 20 of the supporting stage 10 is moved, the edges of the electron beam transmitting holes of the first and second grids are perceived as lines due to difference in light volume of the reflected light from the first and second grids and that from the cathode.

The rotary stage 17, Y-stage 18 and the X-stage 19 are then moved to bring the edges of the electron beam transmitting holes of the first and second grids into coincidence with the centerline of the micro-scale provided on the objective lens 36 and the (X, Y) coordinate is read to measure position deviation between the first and second grids.

The difference in light volume between the light volume of the light reflected by the grid surface and transmitted through the second polarizing plate 35 and that of the light reflected by the electron beam of the cathode is explained with reference to FIGS. 6 and 7. For clarifying how much the volume of light reflected by the grid surface and that reflected by the electron beam emitting surface of the cathode are decreased by traversing the second polarizing plate 35, the following description is made on the assumption that the reflectance on the grid surface and that on the electron beam emitting surface are each equal to 100%. In particular, although the electron beam emitting surface of the cathode presents micro-irregularities, as described above, and hence diffused reflection occurs, it is assumed herein that reflection that occurs is free of diffusion. It is also assumed that the half mirror 33 shown in FIG. 5 is here lacking so that reflectance or the ratio of transmission by the half mirror 33 may safely be disregarded.

Figure 6:
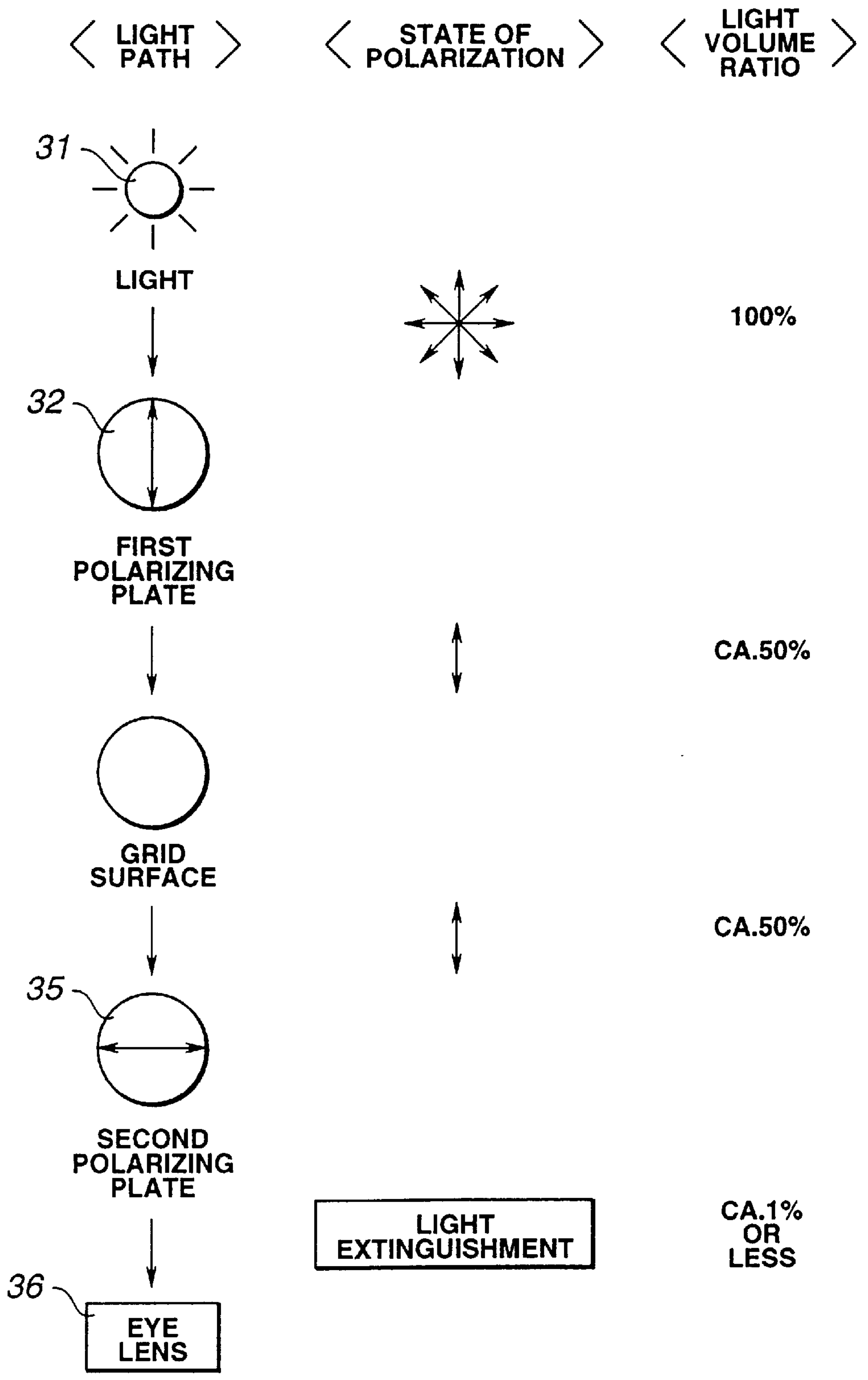
FIG. 6 illustrates the structure of the light volume and the state of polarization of light reflected by the grid surface.

The non-polarized light, emitted by the light source 31 to proceed towards the grid surface, is converted by the first polarizing plate 32 into the linear polarized light so as to be illuminated on the grid surface, as shown in FIG. 6. Of the non-polarized light, radiated by the light source 31, the majority of the light of the polarized light component, perpendicular to the axis of polarization of the first polarizing plate 32,ia absorbed by this first polarizing plate 32, with the remaining 50% light (polarized component of the same orientation as the axis of polarization of the first polarizing plate 32) is transmitted through the first polarizing plate 32. That is, approximately 50% of the light radiated by the light source 31 is transmitted as the linear polarized light through the first polarizing plate 32.

The light transmitted through the first polarizing plate 32 and reflected by the grid surface proceeds towards the second polarizing plate 35 in the linear polarized state because the grid surface is designed as a flat metal surface.

If the second polarizing plate 35 has its axis of polarization arranged at approximately 90° (cross-Nicol) with respect to the axis of polarization of the first polarizing plate 32, not more than 1% of light is transmitted through the second polarizing plate 35 because the extinction ratio of the polarizing plate is usually 1/100 or less.

Figure 7:
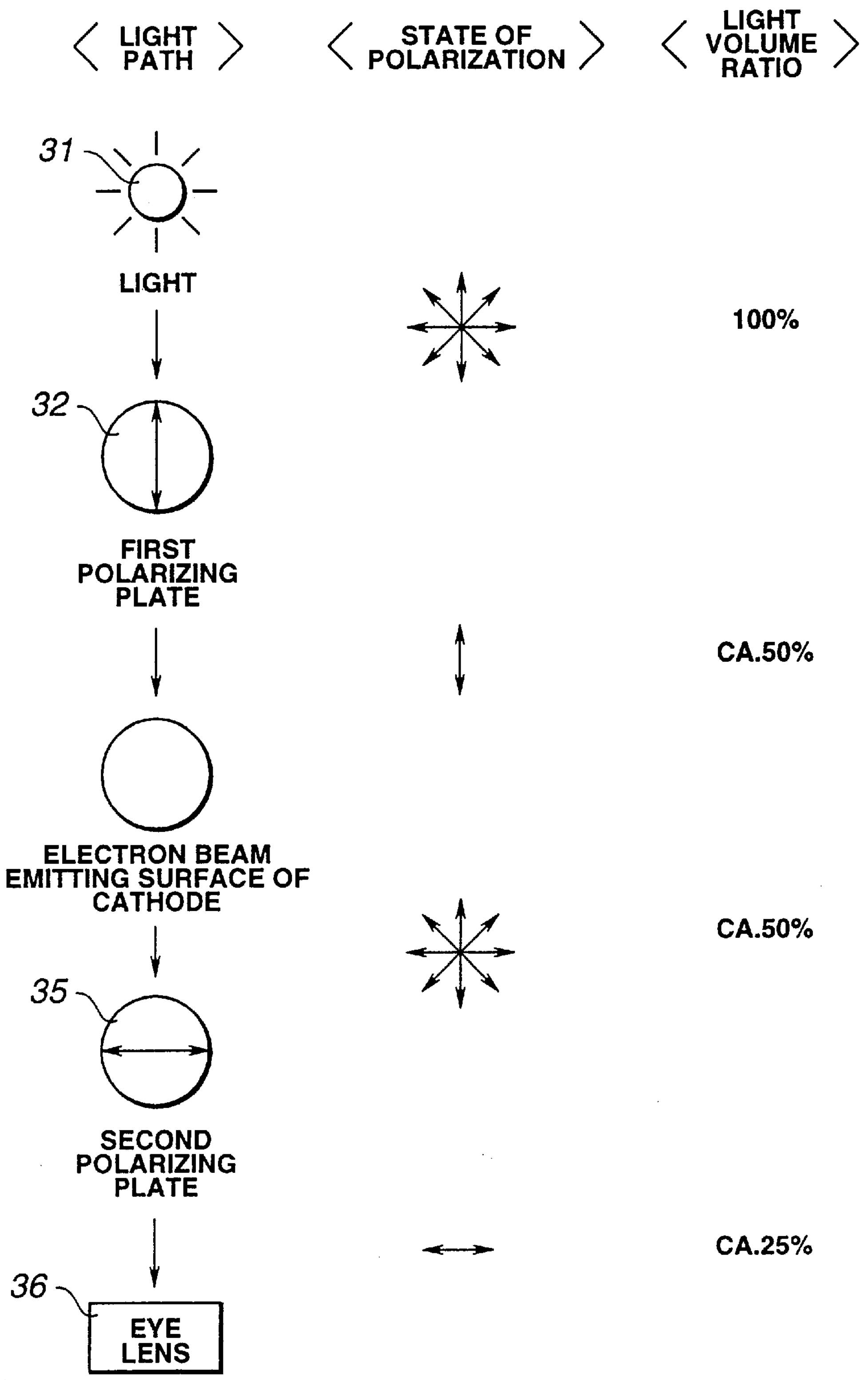
FIG. 7 illustrates the structure of the light volume and the state of polarization of light reflected by the electron beam reflecting surface of the cathode.

On the other hand, the non-polarized light emitted by the light source 31 to proceed towards the electron beam emitting surface of the cathode is converted by the first polarizing plate 32 into the linear polarized light, which is illuminated on the electron beam radiating surface of the cathode, as shown in FIG. 7. It is noted that, of the non-polarized light radiated from the light source 31, the majority of the polarized light component perpendicular to the axis of polarization of the first polarizing plate 32 is absorbed b the first polarizing plate 32, while the remaining 50% light (light of the polarized component having the same orientation as that of the axis of polarization of the first polarizing plate 32) is transmitted through the first polarizing plate 32. That is, approximately 50% of light radiated from the light source 31 is turned into linear polarized light which then traverses the first polarizing plate 32.

The light transmitted through the first polarizing plate 32 and reflected by the electron beam emitting surface of the cathode is subjected to repeated refraction and reflection by the electron beam radiating surface presenting micro-irregularities of oxides and proceeds in the collapsed polarized state to the second polarizing plate 35. Since it is assumed that the reflection on the electron beam emitting surface of the cathode is free of diffusion or absorption, it is the light unchanged in light volume and presenting random polarization that proceeds the second polarizing plate 35.

Of the reflected light from the electron beam emitting surface of the cathode proceeding to the second polarizing plate 35, the majority of light of the polarized component perpendicular to the axis of polarization of the second polarizing plate 35 is absorbed by this second polarizing plate 35, while the remaining 50% light (light of the polarized component having the same direction as the axis of polarization of the second polarizing plate 35), specifically, approximately 25% of the light radiated from the light source 31, is transmitted through the second polarizing plate 35.

The foregoing description refers to the fact that the reflected light of the grid surface and that reflected by the electron beam emitting surface of the cathode are of different light volume through the use of polarized light. In actual observation, the light volume ratio shown in FIGS. 6 and 7 differs from that in the foregoing description due to absorption by the polarizing plate of the light despite polarization in the same orientation as that of the axis of polarization of the polarized plate or due to the performance of a particular polarizing plate such as extinction ratio of the polarizing plate.

In the foregoing description, it is assumed that there lacks a half mirror. In actual illumination and observation, the light volume is halved through the use of the half mirror. Also, the light volume in case of using the half mirror for transmission or reflection is changed by the half mirror performance. On the other hand, the present invention can be practiced using e.g., a polarization beam splitter in place of the half minor. However, the light volume is similarly changed if the polarization beam splitter is used in place of the half mirror.

In the foregoing description, it is assumed that the reflectance on the grid surface and on the electron beam emitting surface of the cathode is 100%. However, in actuality, the reflectance is of a certain definite value. Since the grid surface is a metal surface, it reflects the majority of the incident light without scattering. Thus, the reflectance of the grid surface is high and occasionally reaches 90% or even higher. On the other hand, the electron beam emitting surface of the cathode has irregularities so that reflection produced thereby is not simple reflection such that the state of the observed reflected light consists in a mixture of reflection having certain distribution in the light radiating direction and scattering. This reflected light consisting in a mixture of reflection and scattering has different distribution in the radiating direction depending on the light incident direction. Therefore, the reflectance as found from the volume of the illuminating light and that of the observed light depends not only on the state of the electron beam radiating surface of the cathode but also on the optical performance of the microscope, such as the numerical aperture of the objective lens.

In the foregoing description, the electron beam radiating surface of the cathode is assumed to be 100% reflecting surface for convenience sake. If the electron beam radiating surface of the cathode is assumed to be a fully diffusive reflecting surface that can be replaced by magnesium oxide, the light volume ratio in which the reflected light mainly consisting in scattering rather than reflection can be presumed. In this case, it is necessary to take into account optical characteristics of the microscope, such as numerical aperture of the objective lens.

By properly adjusting the performance of the optical components of the optical system, such as polarizing plate, half mirror or the objective lens, the light reflected by the grid surface can be separated from that reflected by the electron beam radiating surface of the cathode based on the difference in the polarized state to render an observed image more definite.

With the position deviation detection device 1 of the present invention, as described above, the volume of linear polarized light reflected by the grid surface is significantly reduced by using a polarizing plate to render the electron beam radiating surface of the cathode brighter to increase the brightness contrast between the electron beam radiating surface of the cathode and the vicinity of the edge of the beam transmitting hole, so that the edge of the beam transmitting hole can be observed clearly to detect position deviation between the grids of the electron gun accurately.

That is, if the non-polarized light is directly illuminated on the surface 41*a* of the grid 41 and on the electron beam emitting surface 42*a* of the cathode 42 to observe the reflected light, without employing the polarizing plate, the volume of light reflected by an area other than the vicinity 45 of the edge 44 of the electron beam transmitting hole 43 of the grid surface 41*a* is significant, while the volume of light reflected by the vicinity 45 the edge 44 of the electron beam transmitting hole 43 and that reflected by the electron beam emitting surface 42*a* of the cathode 42 are both decreased. Therefore, on observation, the light reflected by the vicinity 45 of the edge 44 of the electron beam transmitting hole 43 and that reflected by the electron beam emitting surface 42*a* of the cathode 42 are mixed together darkly and hence the edge 44 of the electron beam transmitting hole 43 cannot be discerned clearly. Thus, the result that position deviation between the grids 41 o the electron gun cannot be detected accurately.

Figure 8:
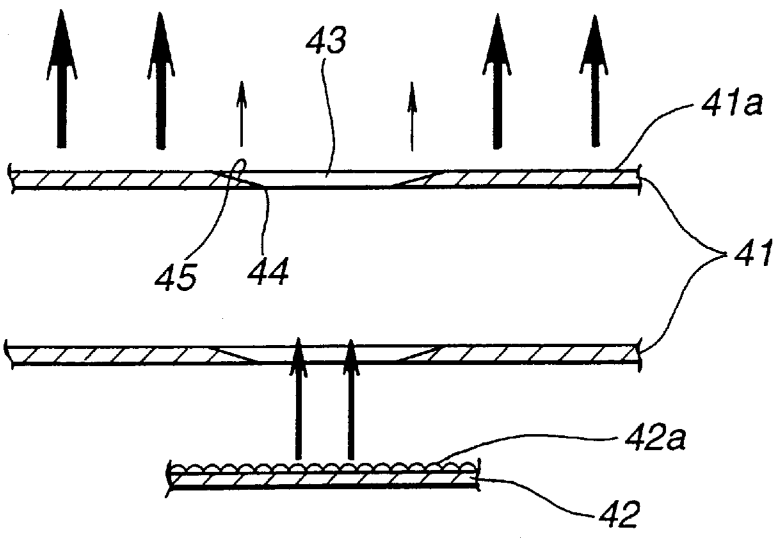
FIG. 8 is a cross-sectional view for illustrating the difference in light volume in case the non-polarized light is illuminated on the grid surface and on an electron beam emitting surface of the cathode and the reflected light is directly observed.
Figure 9:
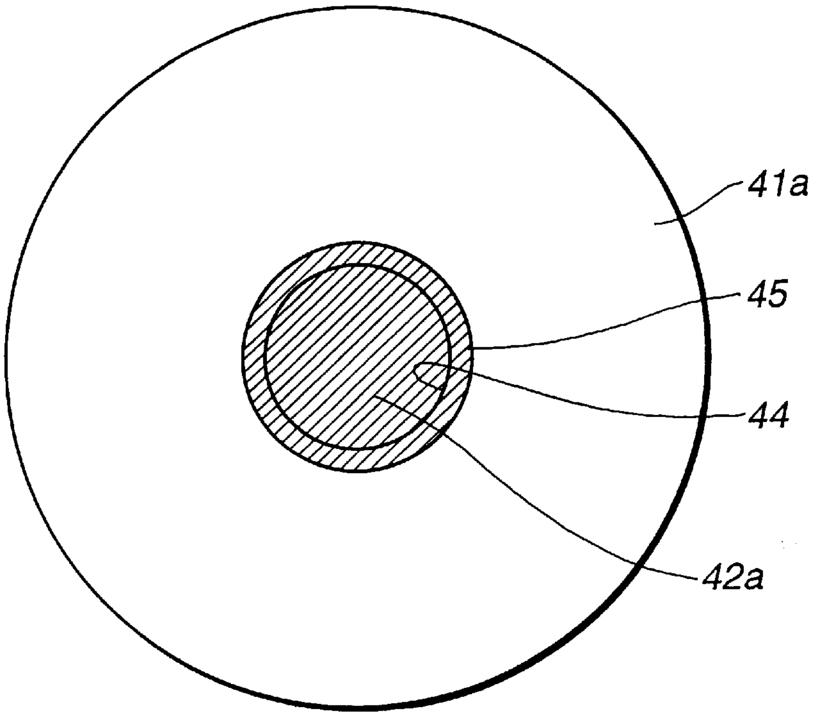
FIG. 9 is a plan view showing an observed image in case the non-polarized light is illuminated on the grid surface and on an electron beam emitting surface of the cathode and the reflected light is directly observed.
Figure 10:
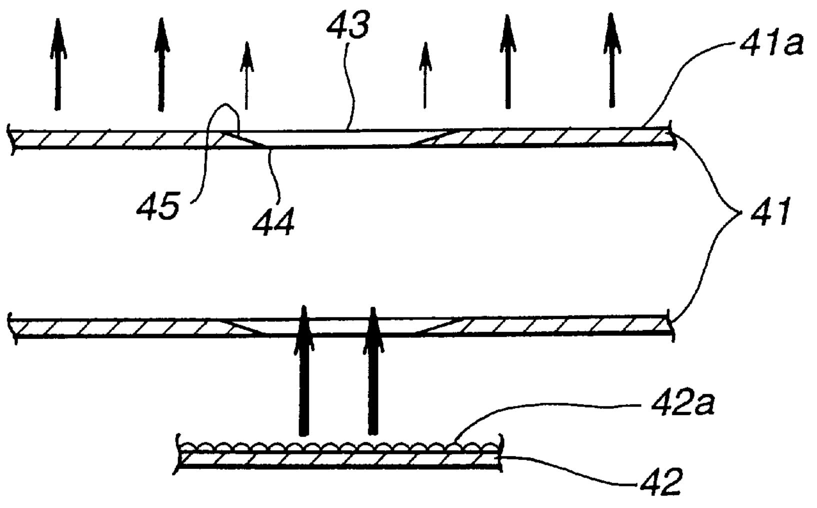
FIG. 10 is a cross-sectional view for illustrating the difference in light volume in case the non-polarized light is illuminated on the grid surface and on an electron beam emitting surface of the cathode and the reflected light is observed via a light polarization plate.
Figure 11:
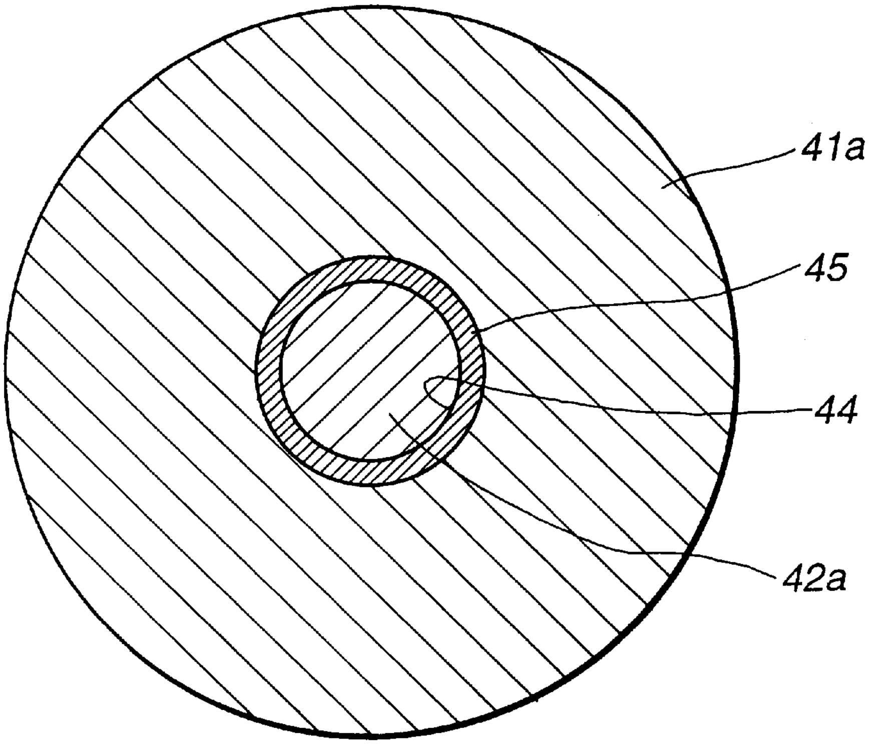
FIG. 11 is a plan view showing an observed image in case the non-polarized light is illuminated of the grid surface and on an electron beam emitting surface of the cathode and reflected light is observed via a light polarization plate.
Figure 12:
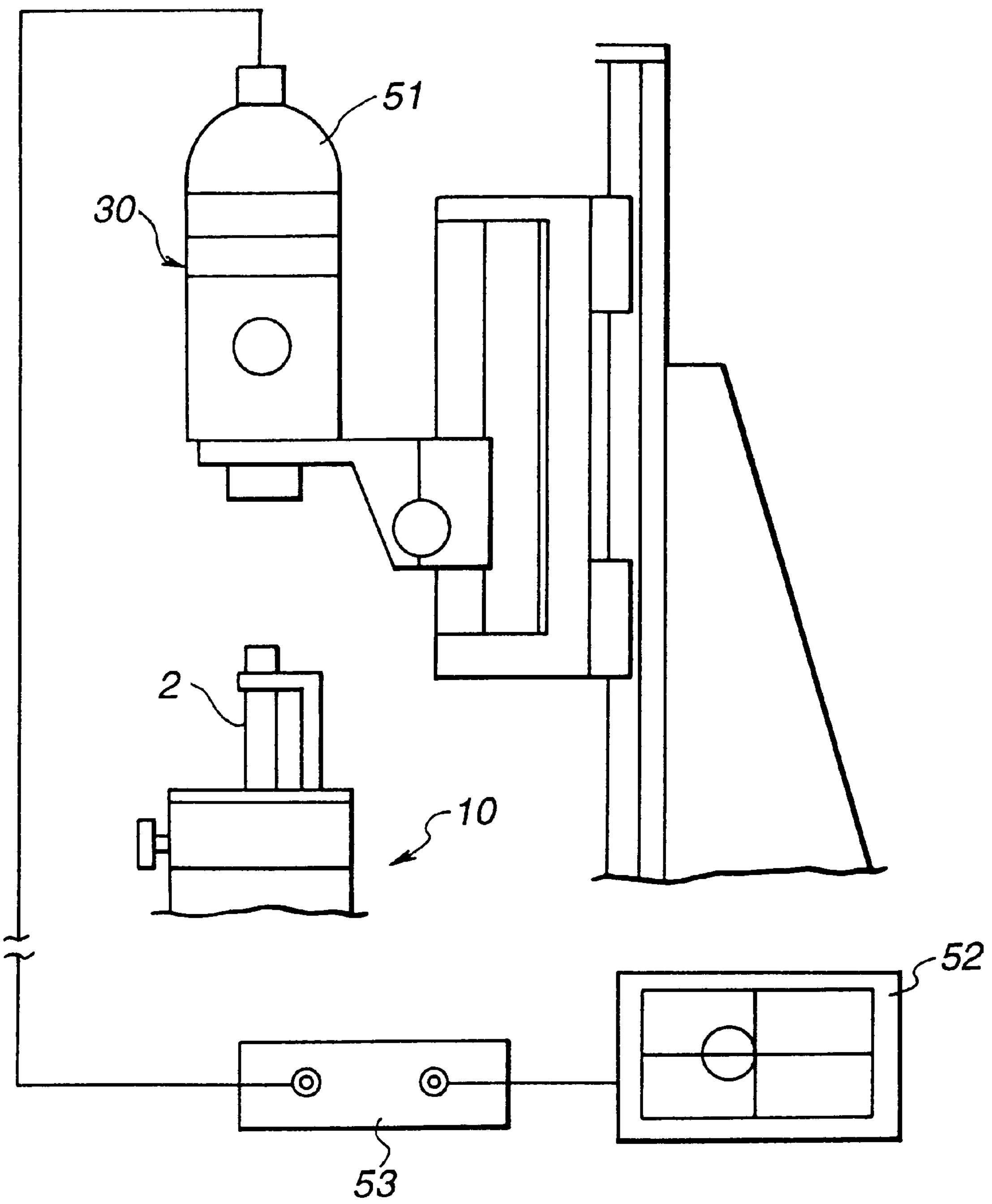
FIG. 12 is a side view showing another embodiment of the position deviation detection device for the electron gun.

Conversely, should the reflected light from the surface 41 a of the grid 41 and that from the electron beam emitting surface 42*a* of the cathode 42 be observed using the position deviation detection device I for the electron gun according to the present invention, the volume of light reflected by the surface 41*a* of the grid 41 is decreased significantly, while that reflected by the electron beam emitting surface 42*a* of the cathode 42 is relatively increased. The result is that the edge 44 of the beam transmitting hole 43 can be discerned accurately so that the position deviation between the grids 41 of the electron gun can be detected accurately. Meanwhile, the difference in the light volume of the reflected light from the electron beam emitting surface 42*a* of the cathode 42 is indicated by difference in thickness of the arrows indicated in FIGS. 8 and 10.

Also, in the position deviation detection 1 for the electron gun according to the present invention, the supporting stage 10 supports the electron gun 2 so that the electron gun 2 has its center axis extending along the Z-axis direction and hence the polarization microscope 30 illuminates the light on the electron gun 2 supported on the supporting stage 10 in the direction along the center axis, thus improving the utilization efficiency of the illuminating light to illuminate the grid surface and the electron beam emitting surface of the cathode brightly uniformly. The result is that, with the position deviation detection 1 for the electron gun of the present invention, the edges of the electron beam transmitting hole can be observed with a high magnifying ratio to detect position deviation between the grids more accurately.

The foregoing description has been made of the position deviation detection 1 for the electron gun in which an image is directly observed via eye lens 36 to detect position deviation between the grids of the electron gun. The position deviation detection for the electron gun according to the present invention is, however not limited to this specified structure. For example, a CCD camera 51 may be mounted on the polarization microscope 30 and an image retrieved by the CCD camera 51 displayed on a monitor 52 to detect position deviation between the grids of the electron gun.

In measuring the amount of position deviation, the edges of the beam transmitting holes are viewed visually to observe the first and second grids. The distance on the image is then measured or the supporting stage 10 is moved to measure the position deviation based on the amount of displacement of the supporting stage 10.

Preferably, the CCD camera 51 and the monitor 52 are connected in this case to the controller 53 to control the CCD camera 51 by the controller 53 and to display a reference line for position deviation measurement on the monitor 52.

By mounting the CCD camera 51 on the CCD camera 51 on the polarization microscope 30 for displaying the image captured by the CCD camera 51 on the monitor 52, it is possible for an operator to view a picture displayed on the monitor 52 to detect position deviation between grids of the electron gun to assure facilitated position deviation operation.

The foregoing description has been made of the position deviation detection device 1 for an electron gun in which the polarization microscope 30 has the light source 31 for radiating non-polarized light and the first polarizing plate 32 and the non-polarized light radiated by the light source 31 is transmitted through the first polarizing plate 32 to illuminate the linear polarized light on the electron gun. The position deviation detection device for an electron gun according to the present invention is, however, not limited to this configuration since the device nay also be configured so that the light us the laser light in which the light source emits the linear polarized light which is directly illuminated on the electron gun without traversing the polarizing plate.

The position deviation detection device for an electron gun according to the present invention may be designed to use the light in the orderly polarized state, such as circular polarized light, instead of illuminating the linear polarized light on the electron gun for discerning the reflected linear polarized light from the reflected in the randomly polarized light. For example, a quarter wave plate may be arranged between the objective lens of the polarization microscope and the electron gun supported on the supporting stage and the linear polarized light passed through the quarter wave plate for conversion to the circular polarized light. The circular polarized light, reflected from the electron gun, may then be again transmitted through the quarter wave late for conversion to the linear polarized light which is observed.

What is claimed is:

1. A method for detecting position detection of an electron gun comprising:

illuminating linear polarized light on an electron gun and observing the reflected light from the electron gun via light polarizing means to detect position deviation between grids of the electron gun.

2. The method according to claim 1 wherein said polarizing means has an axis of polarization substantially perpendicular to the axis of polarization of the linear polarized light illuminated on said electron gun.

3. The method according to claim 1 wherein the linear polarized light is radiated from a light source and is radiated and illuminated on the electron gun.

4. The method according to claim 1 wherein a light radiated from the light source is transmitted through other polarization means for conversion to linear polarized light which is illuminated on the electron gun.

5. The method according to claim 1 wherein the reflected light from the electron gun is captured by a CCD camera and wherein the reflected light captured by said CCD camera is displayed as a picture on a display unit.

6. A position deviation detection apparatus for an electron gun comprising:

illuminating means for illuminating linear polarized light on the electron gun;

light polarization means arranged on an optical path of the reflected light from said electron gun; and position deviation detection means for capturing the reflected light transmitted through said light polarization means for detecting position deviation between grids of said electron gun.

7. The position deviation detection apparatus according to claim 6 wherein said polarizing means has an axis of polarization substantially perpendicular to the axis of polarization of the linear polarized light illuminated on said electron gun.

8. The position deviation detection apparatus according to claim 6 wherein said illuminating means has a light source for radiating the linear polarized light.

9. The position deviation detection apparatus according to claim 6 wherein said illuminating means has a light source and other light polarization means for transmitting the light radiated from said light source to convert the transmitted light to linear polarized light.

10. The position deviation detection apparatus according to claim 6 wherein said position deviation detection means includes a CCD camera for capturing the reflected light from said electron gun and a display unit for displaying the reflected light captured by said CCD camera as a picture.

11. The position deviation detection apparatus according to claim 6 further comprising:

supporting means having a setting surface on which to set the electron gun to support the electron gun.

12. The position deviation detection apparatus according to claim 11 wherein said supporting means includes a mechanism for causing movement of the electron gun in two mutually perpendicular directions parallel to said setting surface.

13. The position deviation detection apparatus according to claim 11 wherein said supporting means includes a mechanism for causing movement of the electron gun in a direction perpendicular to the setting surface.

14. The position deviation detection apparatus according to claim 11 wherein said supporting means includes a mechanism for causing rotation of the setting surface about an axis perpendicular to said setting surface as center.

15. The position deviation detection apparatus according to claim 11 wherein said supporting means includes a mechanism for causing tilting of said setting surface.

* * * * *